(12) United States Patent
Grubbs et al.

(10) Patent No.: US 8,836,497 B2
(45) Date of Patent: Sep. 16, 2014

(54) SYSTEMS AND METHODS FOR CONFIGURING ANALOG PROCESS ALARMS IN CONTROL DEVICES

(75) Inventors: Robert William Grubbs, Salem, VA (US); Lester D. Childs, Salem, VA (US); Timothy Joseph Rhode, Salem, VA (US)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 13/555,863

(22) Filed: Jul. 23, 2012

(65) Prior Publication Data

US 2014/0022072 A1 Jan. 23, 2014

(51) Int. Cl.
*G08B 23/00* (2006.01)

(52) U.S. Cl.
USPC ............................ 340/501; 340/679; 340/517

(58) Field of Classification Search
USPC ............ 340/501, 506, 524, 525, 825.06, 691, 340/517, 679, 519, 522, 825.5, 825.91
See application file for complete search history.

(56) References Cited

U.S. PATENT DOCUMENTS

| | | | |
|---|---|---|---|
| 5,168,441 A | | 12/1992 | Onarheim |
| 5,581,242 A * | | 12/1996 | Arita et al. .................. 340/691.6 |
| 5,812,622 A * | | 9/1998 | Chang et al. .................... 376/259 |
| 6,088,624 A * | | 7/2000 | Khan et al. ....................... 700/86 |
| 7,249,287 B2 | | 7/2007 | Littrell |
| 8,564,399 B2 * | | 10/2013 | Huggett et al. .............. 340/3.42 |
| 2005/0038885 A1 * | | 2/2005 | Agrusa et al. ................. 709/223 |
| 2010/0123722 A1 | | 5/2010 | Grubbs et al. |
| 2012/0116561 A1 * | | 5/2012 | Nakagawa ....................... 700/97 |

OTHER PUBLICATIONS

PCT Search Report and Written Opinion issued in connection with corresponding WO Patent Application No. PCT/US2013/045109 dated on Oct. 7, 2013.
Automationdirect.com, "Lookout (TM) Direct Developer's Manual," Nov. 2002, XP55081184, Retrieved from the Internet: URL: http://www.automationdirect.com/static/manuals/lkddevm/lkd_developersm.pdf [retrieved on Sep. 26, 2013], Chapters 9 and 11.

* cited by examiner

*Primary Examiner* — Daniel Previl
(74) *Attorney, Agent, or Firm* — Sutherland Asbill & Brennan LLP (57) ABSTRACT

Systems and methods for configuring an analog process alarm in digital control devices are provided. In one example embodiment, a system may include a logic editor configured to create templates, including one or more alias names for corresponding one or more analog alarm sub-variables associated with an analog process variable, within the digital control system; a human-machine interface configured to provide to a user an analog alarm virtual block diagram visualizing processing logic associated with the analog process variable within the digital control system and to receive from the user a request to select a template from the created templates; and a template generator configured to automatically generate, based on the selection of the template, the alias names for the corresponding analog alarm sub-variables of the analog process alarm. The alias names may be defined directly on the analog process variable.

20 Claims, 6 Drawing Sheets

SYSTEMS AND METHODS FOR CONFIGURING ANALOG PROCESS ALARMS IN CONTROL DEVICES

TECHNICAL FIELD

This disclosure relates generally to control systems and, more particularly, to systems and methods for configuring analog process alarms in control devices.

BACKGROUND

Operators of certain digital control systems for some power generation equipment or processes may receive warnings when such equipment or processes are out of expected operational ranges. Such equipment may include machinery in power plants, oil refineries, pipeline pumping stations, manufacturing facilities, and many other appropriate applications. These notifications commonly take the form of "alarms" that are announced to the operators through means such as horns, indicator lights, and alarm lists on human-machine interfaces (HMIs). In some conventional digital control systems, there is a particular class of alarms called "analog process alarms." Analog alarms can be configured on any analog process variable and can generate alarm states for a number of conditions. For any given analog alarm, there can be numerous enables, set-point values, time delay values, and alarm flag variables.

Configuring a number of analog alarms in certain conventional systems may be time consuming, because each analog alarm can be configured in the corresponding analog process variable. Moreover, configuring analog alarms in such a manner may result in a lack of consistency and uniformity between analog alarms.

In certain conventional systems, function blocks in the controller runtime can be used to generate analog alarms. However, this can introduce a layer between the process variable and its analog alarm configurations, which makes maintenance and changes to the system relatively more difficult.

Additionally, in some cases, naming conventions in the control system and at the customer facility may differ. For example, the primary name for an "exceeds high limit" variable in the control system may be "00AI1000.H" while the customer name for the variable may follow, for example, the Kraftwerks Kennzeichnungs System (KKS) naming convention. In this instance, to display variables in a familiar way, operators may need to manually assign KKS names to each alarm variable resulting in a substantial effort.

Thus, the conventional systems do not provide for configuring analog process alarms in digital control systems that allow managing the configuration and documentation of an analog alarm from a single point within the control logic and to provide automation and cross-referencing of the variables associated with an alarm. Furthermore, the existing solutions do not provide for a centralized template-based naming mechanism for analog alarms in digital control systems.

SUMMARY OF THE DISCLOSURE

The present disclosure relates to computer-implemented methods for configuring analog process alarms in control devices. According to one embodiment, a method is provided. The method can include creating, within the digital control system, one or more templates, wherein each template includes one or more alias names for corresponding one or more analog alarm sub-variables associated with an analog process variable; providing to a user, via a human-machine interface, an analog alarm virtual block diagram visualizing processing logic associated with the analog process variable within the digital control system; receiving, from the user, a request to select a template from the one or more templates, and based on the selection of the template, automatically generating the one or more alias names for the corresponding one or more analog alarm sub-variables of the analog process alarm, wherein the one or more alias names are defined directly on the analog process variable.

According to another embodiment, a system is provided. The system can include a logic editor configured to create, within the digital control system, one or more templates, wherein each template includes one or more alias names for corresponding one or more analog alarm sub-variables associated with an analog process variable; a human-machine interface configured to provide to a user, an analog alarm virtual block diagram visualizing processing logic associated with the analog process variable within the digital control system and to receive, from the user, a request to select a template from the one or more templates; and a template generator configured to automatically generate, based on the selection of the template, the one or more alias names for the corresponding one or more analog alarm sub-variables of the analog process alarm, wherein the one or more alias names are defined directly on the analog process variable.

According to yet another embodiment, a non-transitory processor-readable medium is provided. The medium can have instructions for configuring an analog process alarm in a digital control system, which when executed by one or more processors, cause the one or more processors to create, within the digital control system, one or more templates, wherein each template includes one or more alias names for corresponding one or more analog alarm sub-variables associated with an analog process variable; provide to a user, via a human-machine interface, an analog alarm virtual block diagram visualizing processing logic associated with the analog process variable within the digital control system; receive, from the user, a request to select a template from the one or more templates; and, based on the selection of the template, automatically generate the one or more alias names for the corresponding one or more analog alarm sub-variables of the analog process alarm, wherein the one or more alias names are defined directly on the analog process variable.

Other example embodiments and aspects will become apparent from the following description taken in conjunction with the following drawings.

DETAILED DESCRIPTION

The following detailed description includes references to the accompanying drawings, which form part of the detailed description. The drawings depict illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The example embodiments disclosed herein may be implemented using a variety of technologies. For example, the methods described herein may be implemented in software executing on a computer system or in hardware utilizing either a combination of microprocessors, or other specially designed application-specific integrated circuits (ASICs), programmable logic devices, or various combinations thereof. In particular, the methods described herein may be implemented by a series of computer-executable instructions residing on a storage medium, such as a disk drive or a computer-readable medium.

The embodiments described herein relate to a computer-implemented method for configuring an analog process alarm in digital control systems. Digital control systems are used to control various equipment, such as power plants, oil refineries, pipeline pumping stations, manufacturing facilities, and so forth. Sometimes, equipment or processes controlled by a digital control system may come out of expected operational ranges. For example, process temperature may become too high or pressure may become too low. When this happens, the digital control system may provide specific notifications in the form of horns, indicator lights, and alarm lists on HMIs to operators.

In accordance with example embodiments, analog alarms, which generate alarm states for a number of conditions, may be represented and controlled by a special virtual block. The analog alarm virtual block may provide a user interface to configure and display analog alarm data. This may allow a user to check the status and configuration of an analog alarm on the logic diagram.

Using the analog alarm virtual block, users may configure the analog alarms centrally, from a single point, and since this block is merely a visualization and not a runtime construct, analog alarms may be defined directly on a process variable. In contrast to the conventional solutions, the embodiments described herein may enable configuring analog alarms without introducing a layer between the process variable and the analog alarm configurations for the process variable. Thus, maintenance and changes to the digital control system may be simplified by the example embodiments described herein.

In some example embodiments, a method for configuring an analog process alarm in digital control systems may comprise creating templates for generating analog alarm names. Each template may include one or more alias names corresponding to one or more analog alarm sub-variables associated with an analog process variable. Thus, an alias name for an analog alarm sub-variable may be generated automatically based on the selected template by means of substituting different portions of the name of an analog alarm sub-variable.

The technical effects of certain embodiments of the disclosure may include improving the usability as well as simplifying maintenance and modifications of digital control systems by providing a centralized user interface to configure and display analog alarm data associated with analog alarms. Further technical effects may include the ability to define analog alarms directly on a process variable via a visualization block and eliminating the need for runtime constructs. Yet, further technical effects may include maintaining uniformity in analog alarm sub-variable naming, facilitating analog alarm renaming, and reducing human error and configuration time by using predefined alias-based templates for generating analog alarm names.

Figure 1:
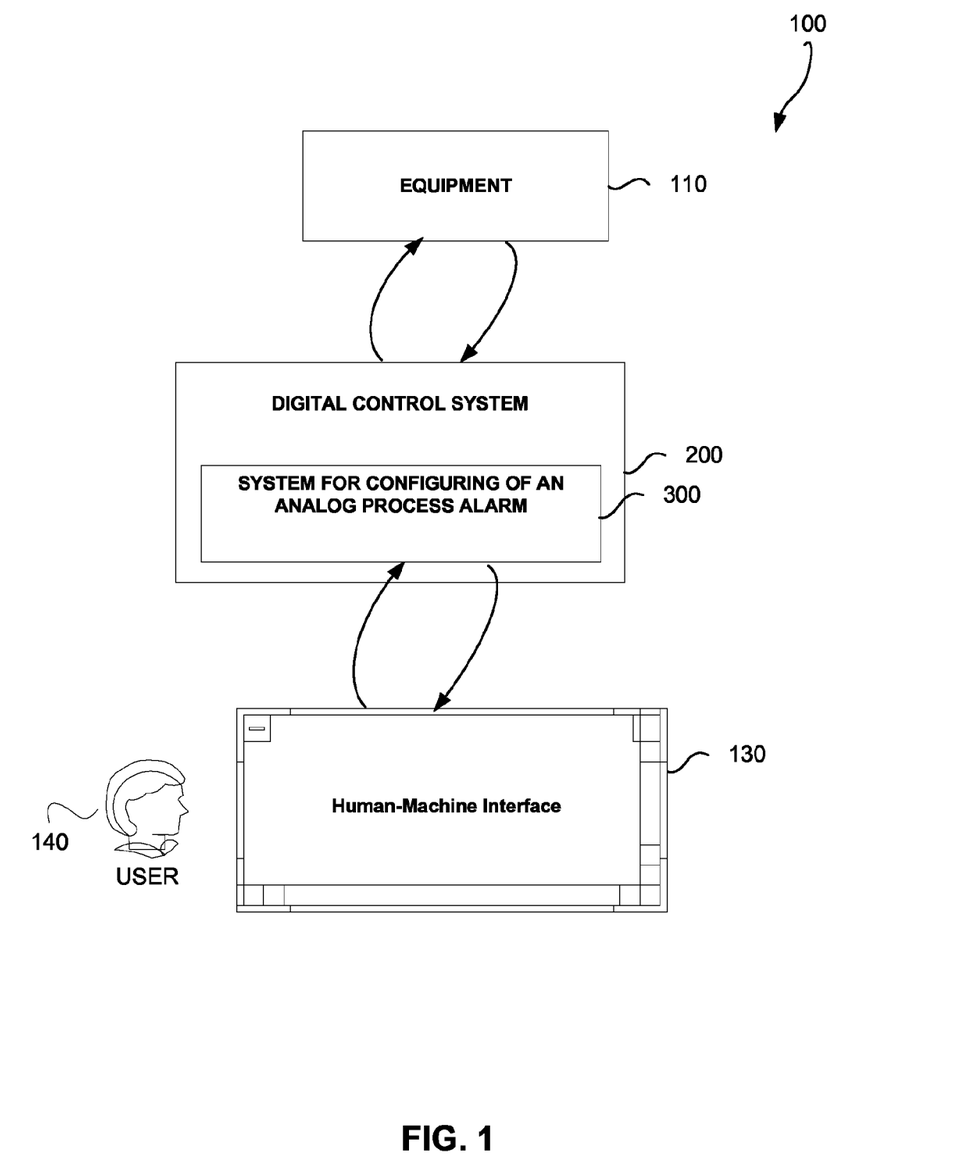
FIG. 1 depicts a block diagram illustrating an example environment and system, in accordance with an embodiment of the disclosure.

Referring now to the drawings, FIG. 1 depicts a simplified diagram illustrating a system environment 100 suitable for implementing methods for configuring an analog process alarm in a digital control system, in accordance with one or more example embodiments. In particular, the system environment 100 may comprise an equipment 110, a digital control system 200 with a system for configuring an analog process alarm 300, a human-machine interface 130, and a user 140.

The equipment 110 may include machinery in power plants, oil refineries, pipeline pumping stations, manufacturing facilities, and so forth. The equipment 110 and the configuration of the analog alarms for the equipment 110 may be controlled by the digital control system 200. The digital control system 200 may include the system for configuring an analog process alarm 300 that wraps up the configuration and documentation of analog alarms for the equipment 110 into one place in the control logic, thus allowing for automation and cross referencing of the variables associated with the alarm.

The user 140 may interact with the digital control system 200 via the human-machine interface 130. The human-machine interface 130 may provide control and visualization of the analog alarm configuration and may include simple text displays, graphical operator panels, touch screens, Industrialized Personal Computers (iPCs), Supervisory Control and Data Acquisition (SCADA), web-based HMI solutions, and so forth.

Figure 2:
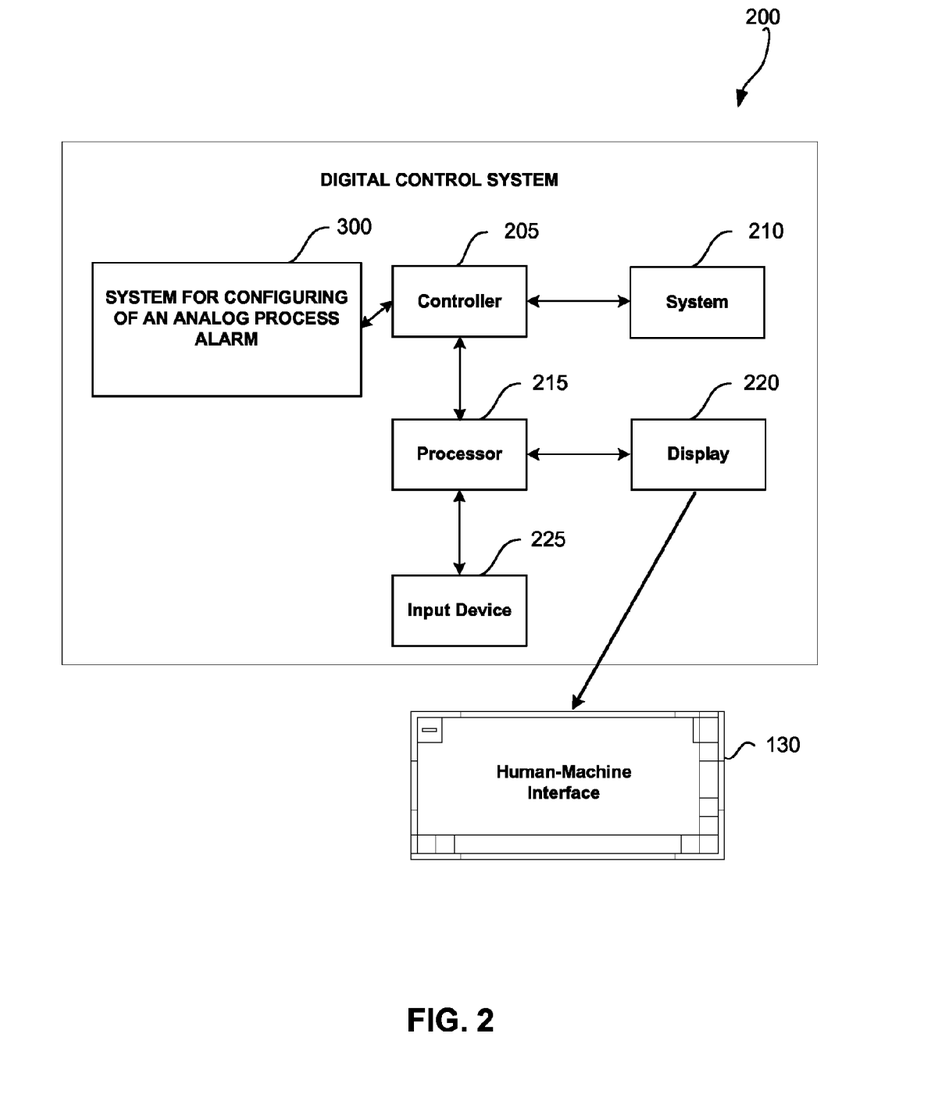
FIG. 2 depicts an example digital control system in accordance with an example embodiment of the disclosure.

FIG. 2 depicts a schematic representation of a digital control system 200 with an introduced system for configuring an analog process alarm 300, in accordance with one or more example embodiments. The digital control system 200 may include a processor 215 that is operative to run the system for configuring an analog process alarm 300. The processor 215 may be communicatively coupled to an input device 225, a display 220, and a controller 205. The controller 205 may be communicatively coupled to the equipment (not shown) that may, for example, include power plants, oil refineries, pipeline pumping stations, manufacturing facilities, and so forth. In operation, the system for configuring an analog process alarm 300 may be run by the processor 215 and is graphically displayed on the display 220. The user 140 may use the input device 225 to input commands to the system for configuring an analog process alarm 300. The data of the equipment 110 may be received by the controller 205 and processed by the processor 215. The logic of the analog alarms and analog variable definitions may reside in the processor 215 and/or the controller 205. The system for configuring an analog process alarm 300 may receive data on the logic of the analog alarms and the analog variable definitions and virtually represent these data on the display 220. When the user 140 inputs commands to the input device 225 for the system for configuring an analog process alarm 300, the commands may be transmitted to the logic of the analog alarms, and the analog variable definitions may be performed there directly.

Figure 3:
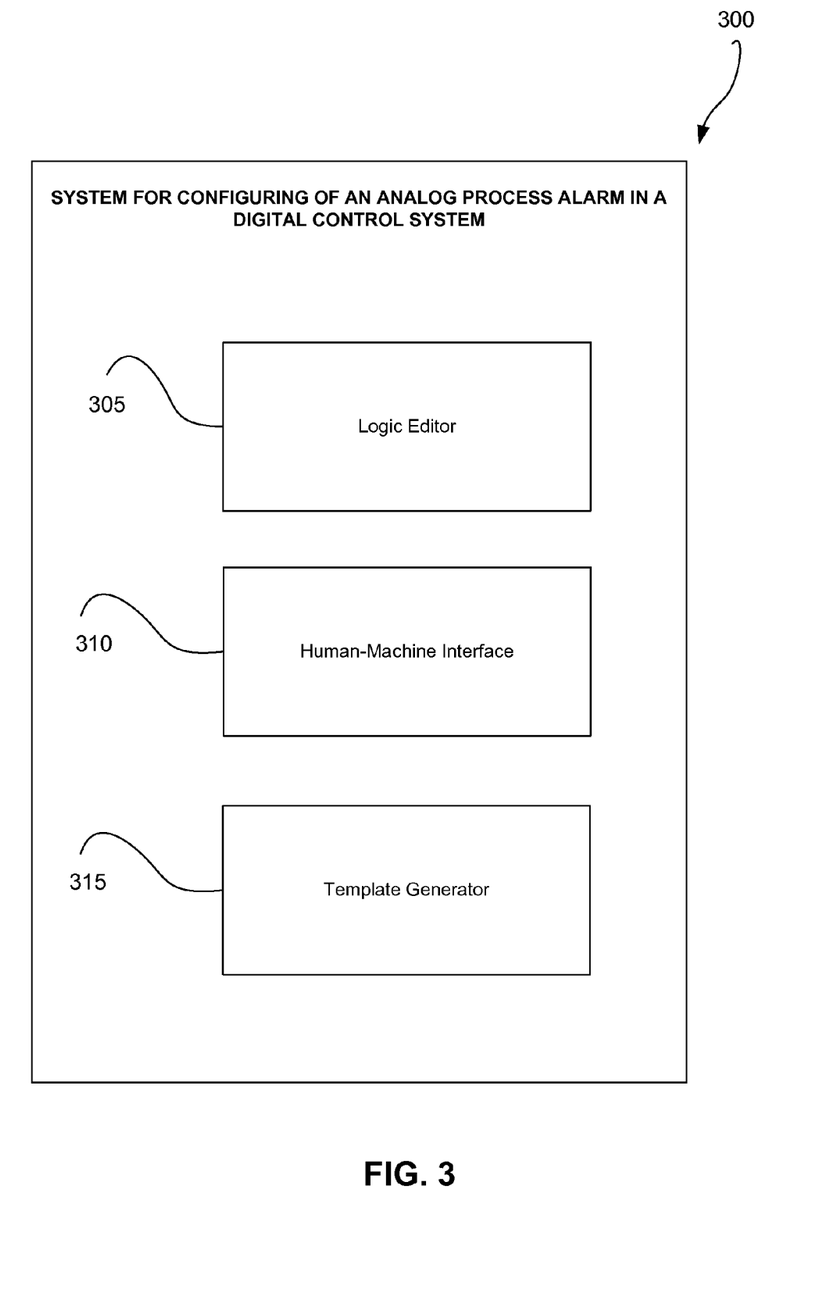
FIG. 3 depicts a block diagram illustrating various modules of the system for configuring an analog process alarm in accordance with an example embodiment of the disclosure.

FIG. 3 depicts a block diagram illustrating various modules of the system for configuring an analog process alarm 300, in accordance with one or more example embodiments. The system for configuring an analog process alarm 300 may include, embed, or be coupled to a logic editor 305, a human-machine interface 310, and a template generator 315. In general, the system for configuring an analog process alarm 300 may be configured to implement the method disclosed herein for configuring an analog alarm. In an example embodiment, the system for configuring an analog process alarm 300 may be a dedicated software application which may be installed on the digital control system 200.

In some example embodiments, the logic editor 305, the human-machine interface 310, and the template generator 315 may be integrated within a single apparatus, or, alternatively, may be remotely located and optionally accessed via a third party. The system for configuring an analog process alarm 300 may further include additional modules, but the disclosure of such modules is omitted so as not to burden the entire description of the present teachings.

The logic editor 305 may be configured to create templates for names of analog alarm variables within the digital control system 200. Each template may include one or more alias names for corresponding analog alarm sub-variables of an analog process variable. Based on alias names of sub-variables, the alarm variable name may be generated.

The human-machine interface 310 may be configured to provide an analog alarm virtual block diagram to a user. The analog alarm virtual block diagram may visualize processing logic associated with analog process variables within the digital control system. Additionally, via the human-machine interface 310, requests to select a template from the templates available in the digital control system may be received from the user.

The template generator 315 may be configured to automatically generate alias names for the corresponding analog alarm sub-variables of the analog process alarm based on the template selected by the user 140. The alias names may be defined directly on the analog process variable, as well as other configuration attributes modified using the system for configuring an analog process alarm 300.

Alias names may be defined directly on the analog process variable, because the system for configuring an analog process alarm 300 may not store configuration attributes for the analog alarms, but rather may wrap them up and provide their representation to the user 140.

Figure 4:
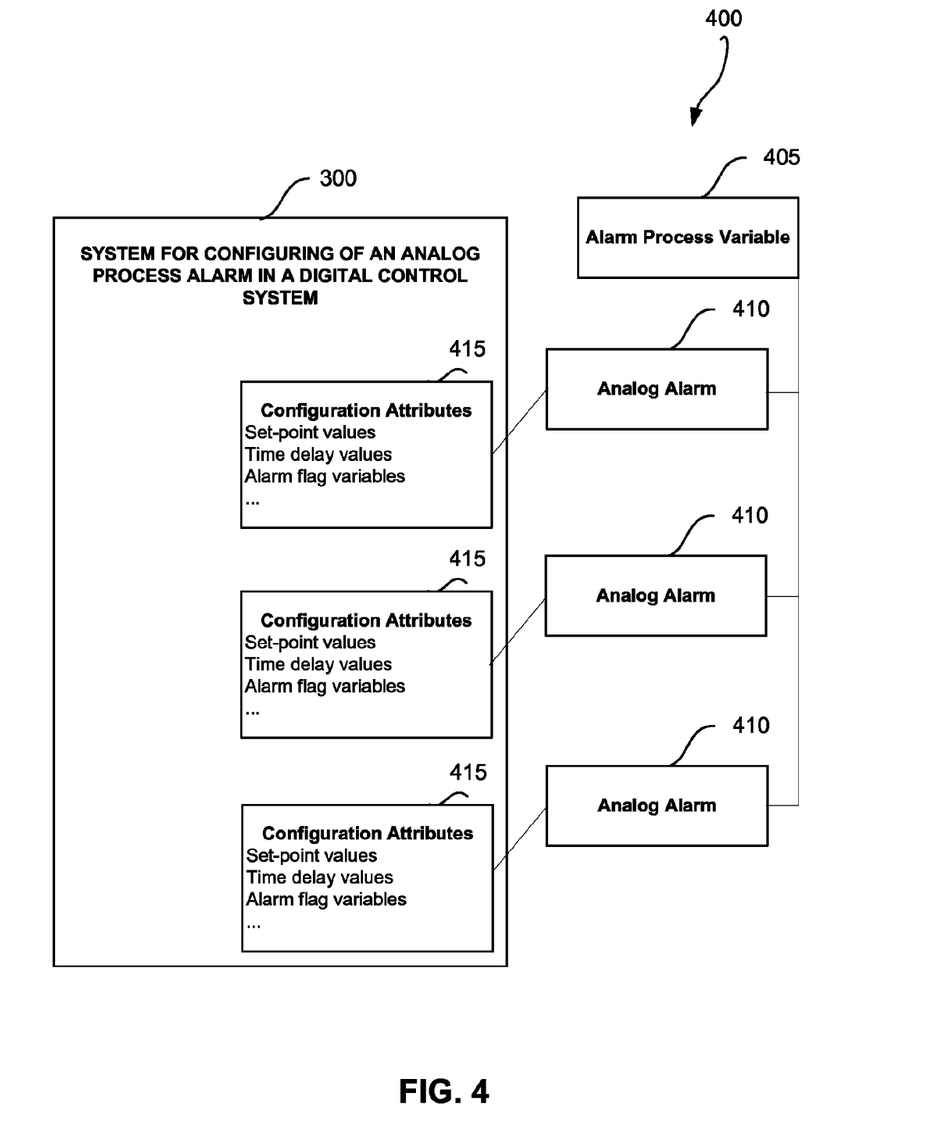
FIG. 4 depicts a block diagram illustrating wrapping of the configuration attributes of the analog alarms in the system for configuring an analog process alarm in accordance with an example embodiment of the disclosure.

FIG. 4 depicts a block diagram illustrating wrapping 400 the configuration attributes of the analog alarms in the system for configuring an analog process alarm 300, in accordance with one or more example embodiments.

Analog alarms 410 associated with an alarm process variable 405 within the digital control system may include configuration attributes 415. These configuration attributes 415 may comprise set-point values, time delay values, alarm flag variables, and so forth. The system for configuring an analog process alarm 300 may wrap up the configuration attributes 415, present them to users and enable users to modify configuration attributes 415. Due to wrapping the configuration attributes 415, the configuration attributes 415 of a variable may be performed without creating a layer between the alarm process variable 405 and the analog alarm configurations.

Alarm process variables 405 in the digital control system 200 represent some parameters of the equipment 110, such as temperature, pressure, level, pH, density, moisture content, weight, speed, and so forth. During the operation of the equipment 110, some of the parameters may deviate from expected operational ranges. When this happens, an alarm condition may occur.

In some example embodiments, when the digital control system 200 determines that an alarm condition occurred, an analog alarm may be triggered, and the user 140, including a system engineer or an operator of the digital control system 200, may be notified about the alarm condition. In some example embodiments, the user 140 may be notified via a sound, an indicator light, an alarm list, and so forth.

According to certain example embodiments, actions may be performed based on the determination that an alarm condition has occurred. These actions may be performed with respect to set-point values, time delay values, or alarm flag variables and may be controlled via the system for configuring an analog process alarm 300. For this purpose, the system for configuring an analog process alarm 300 may provide to the user 140 an analog alarm virtual block diagram visualizing the processing logic associated with the analog process variables within the digital control system. Using this analog alarm virtual block diagram, the user 140 may view and modify the status and configuration of the analog alarms.

Additionally, the analog alarm virtual block diagram provides access to a configuration box that may allow managing some analog alarm properties associated with the analog alarm sub-variables. Such analog alarm properties may include, for example, inputs, outputs, parameters, and so forth.

According to certain example embodiments, the analog alarm virtual block diagram may be provided in the form of a block with an intelligent block shape.

Analog alarm variables in the digital control system 200 may be named according to a naming convention that is different than the naming convention adopted by the organization of the user 140. To view analog alarms in a familiar way, the user 140 may want to display analog alarm names substituted by aliases (second names for variables that allow a single variable to simultaneously follow multiple naming conventions). For this purpose, the system for configuring an analog process alarm 300 may also allow creating templates for names of analog alarm variables.

Based on the templates, the system for configuring an analog process alarm 300 may automatically generate an alias name for each analog alarm sub-variable. Rather than manually assigning another name for each alarm variable, the alias may be defined once per system with "substitution" strings to generate different portions of the name.

In some example embodiments, each template for names of the analog alarm variables may correspond to a specific naming convention, such as KKS.

Figure 5:
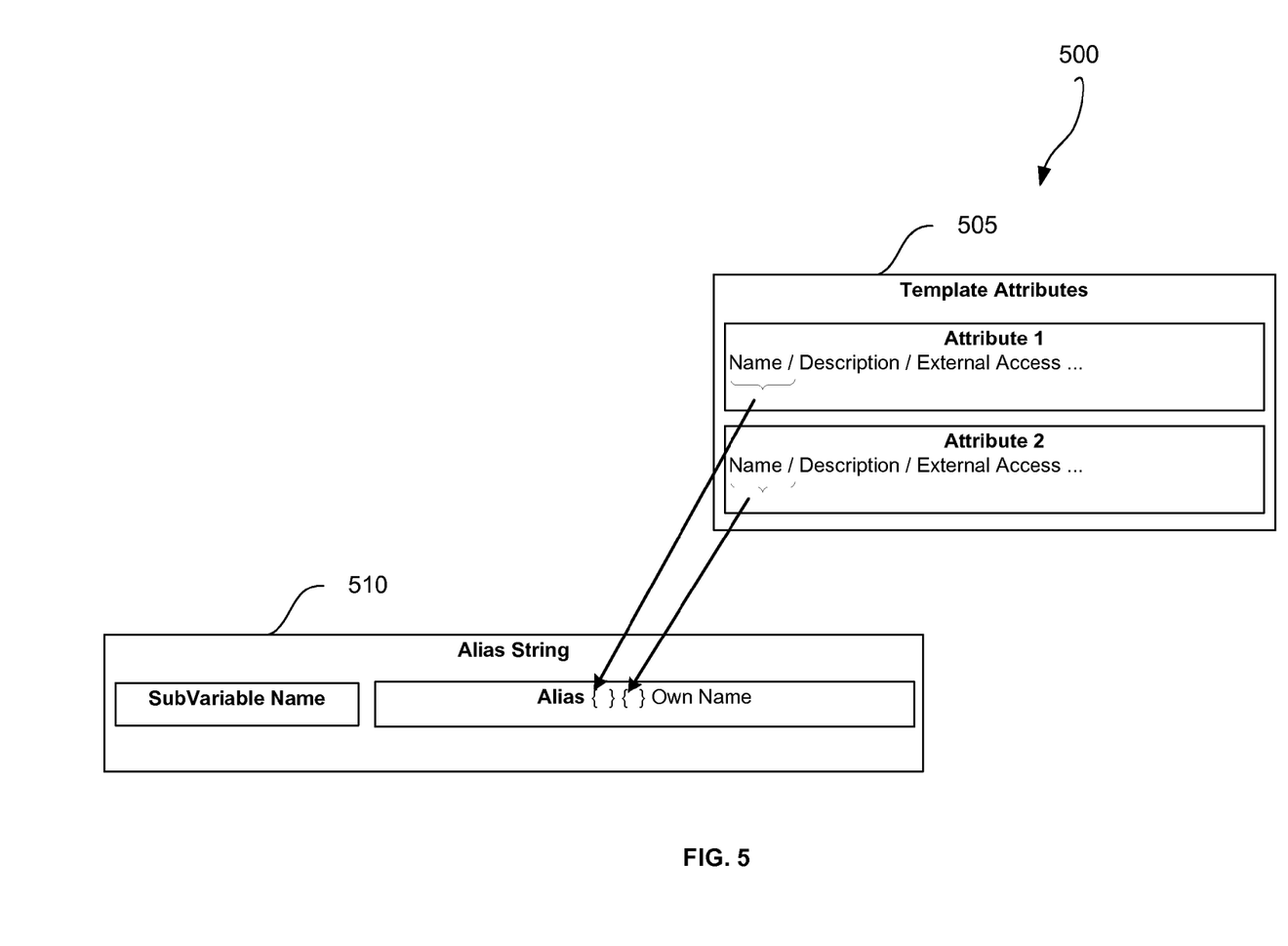
FIG. 5 depicts a schematic representation of automated generation of an alias name for an analog alarm sub-variable based on created templates in accordance with an example embodiment of the disclosure.

FIG. 5 depicts a schematic representation of automated generation 500 of an alias name for an analog alarm sub-variable based on created templates, in accordance with one or more example embodiments.

Templates may be created by an operator or controls engineer of the digital control system 200 when the analog alarm virtual block is inserted in the digital control system 200. The operator may select a template to process and be prompted to enter values for each attribute defined in the template.

Template attributes 505 of a template may include a plurality of attributes including an attribute name, description, and so forth. The operator may specify values for the attributes of the selected template according to the naming convention of the template.

Based on the values specified for the attributes, an alias string 510 for a sub-variable name may be automatically generated by composing an alias name from the names of the attributes. The attribute values may be then substituted into alias strings, and each alias may be applied to the corresponding alarm variable.

In some example embodiments, when generated, the alias name may be put into the alias property for the corresponding sub-variable.

The system for configuring an analog process alarm 300 may contain a plurality of templates created in accordance with different naming conventions. The user 140 may select the template to be used.

Automated generation of alias names for alarm variables facilitates providing aliases for alarm variables, thereby eliminating human error and time. Moreover, due to automated generation, alias names may preserve uniformity and consistency and avoid formatting differences and variants.

Figure 6:
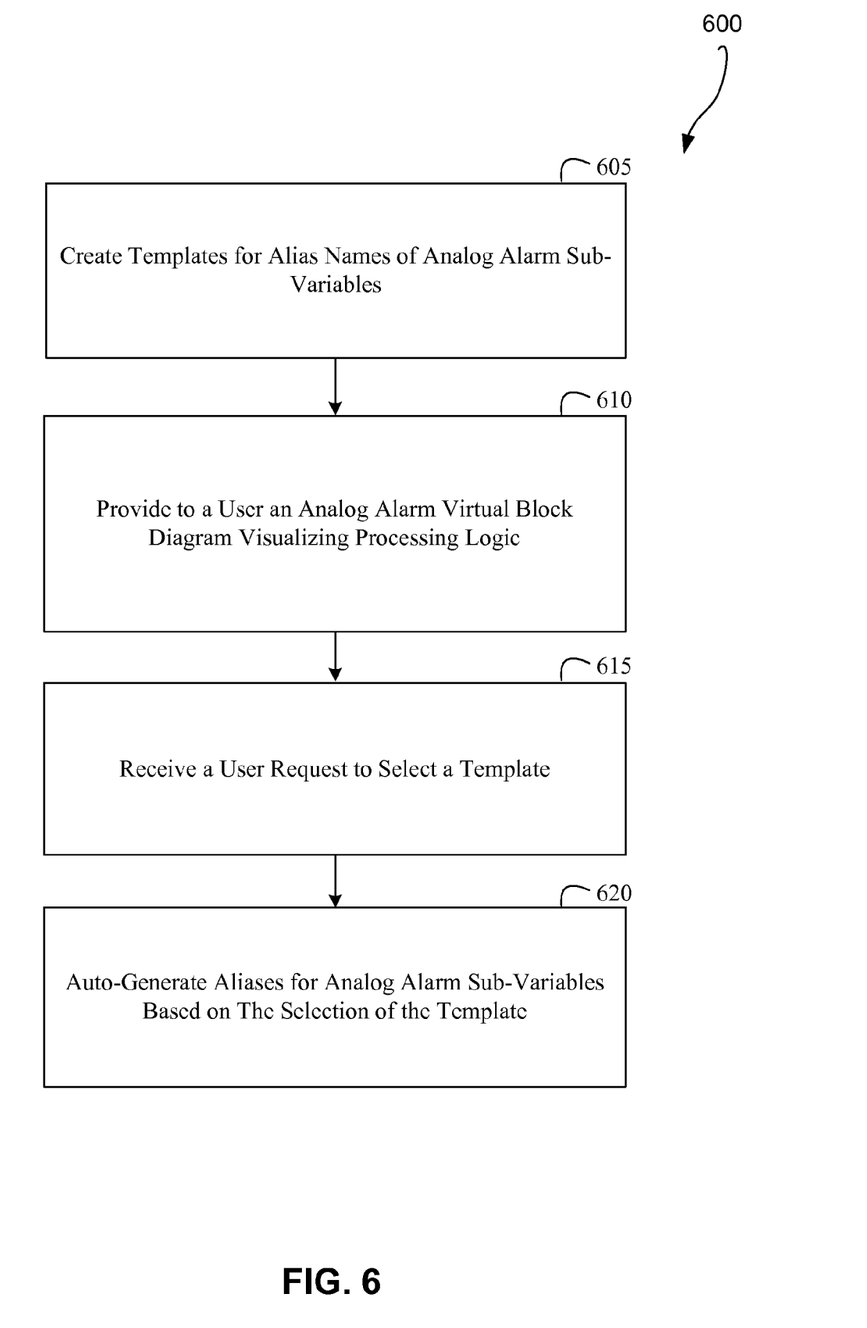
FIG. 6 depicts a flow diagram of a method in accordance with an example embodiment of the disclosure.

FIG. 6 depicts a flow diagram of a method 600 for configuring an analog process alarm in accordance with one or more example embodiments. The method 600 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the system for configuring an analog process alarm 300, which may reside in the digital control system 200. The method 600 may be performed by the various modules discussed above with reference to FIG. 3. Each of these modules may comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform one or more steps described herein, fewer or more modules may be provided and still fall within the scope of the example embodiments.

As shown in FIG. 6, the method 600 may commence at operation 605 with the logic editor 305 creating templates for alias names of analog alarm sub-variables. Creating a template, in some embodiments, may include providing a configuration dialog box to an operator. In this configuration dialog box, an operator may input alias names for sub-variables. When the input data related to alias names for sub-variables is received, alias names may be saved to a digital control system database.

At operation 610, the human-machine interface 310 may provide to a user an analog alarm virtual block diagram visualizing the processing logic. The analog alarm virtual block diagram may provide a user interface to configure and display analog alarm data. The user interface may show the user the status and configuration of an analog alarm on the logic diagram.

In some embodiments, the analog alarm virtual block diagram may reference the variable by displaying the analog alarm data on the logic diagram in the form of a user block with an intelligent block shape.

At operation 615, the human-machine interface 310 may receive a user request to select a template from the templates available in the system for configuring an analog process alarm 300 to substitute analog alarm names with aliases corresponding to a specific naming convention.

At operation 620, the template generator 315 may automatically generate aliases for analog alarm sub-variables based on the selection of the template. The generated aliases may correspond to a specific naming convention and may substitute primary names of analog alarm sub-variables as displayed for the user.

In some example embodiments, the generated aliases may be stored to the alias property for the corresponding sub-variable. The method 600 may enable centralized configuring of analog process alarm aliases and configuration and allow automation and cross referencing of the variables associated with the alarm. The analog alarm virtual block diagram representing the analog process alarm with its statuses, parameters, and configuration may not be a runtime construct, but a visualization, so that analog alarms may be maintained directly on a process variable.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions that execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. The one or more components of the systems may also be practiced with other computer system configurations, including hand-held devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for configuring an analog process alarm in a digital control system, the method comprising:
   creating, within the digital control system, one or more templates, wherein each template includes one or more alias names for corresponding one or more analog alarm sub-variables associated with an analog process variable;
   providing to a user, via a human-machine interface, an analog alarm virtual block diagram visualizing processing logic associated with the analog process variable within the digital control system;
   receiving, from the user, a request to select a template from the one or more templates; and
   based on the selection of the template, automatically generating the one or more alias names for the corresponding one or more analog alarm sub-variables of the analog process alarm by substituting different portions of the name of an analog alarm sub-variable, wherein the one or more alias names are defined directly on the analog process variable.

2. The method of claim 1, further comprising:
   determining that an alarm condition has occurred; and
   based on the determination, selectively providing one or more notifications to an operator of the digital control system.

3. The method of claim 2, further comprising, based on the determination that the alarm condition has occurred, performing one or more of the following actions: enabling a process, providing a set-point value, providing a time delay value, and setting an alarm flag variable.

4. The method of claim 2, wherein the alarm condition includes an unexpected operational value.

5. The method of claim 2, wherein the one or more notifications include one or more of a sound, an indicator light, and an alarm list.

6. The method of claim 1, wherein the creating of a template includes:
   providing, to an operator, a configuration dialog box;
   receiving, from the operator, input data, the input data including the one or more alias names for the sub-variables; and
   saving the one or more alias names to a digital control system database.

7. The method of claim 6, wherein the sub-variables are associated with one or more of the following analog alarm properties: an input, an output, a parameter, and the operator being able to set the analog alarm properties using the configuration dialog box.

8. The method of claim 1, wherein the one or more alias names correspond to a specific naming convention.

9. The method of claim 1, wherein each of the one or more templates corresponds to a specific naming convention.

10. The method of claim 1, wherein the analog alarm virtual block diagram is provided in a form of a block with an intelligent block shape.

11. A system for configuring an analog process alarm in a digital control system, the system comprising:
    a logic editor configured to create, within the digital control system, one or more templates, wherein each template includes one or more alias names for corresponding one or more analog alarm sub-variables associated with an analog process variable;
    a human-machine interface configured to provide to a user, an analog alarm virtual block diagram visualizing processing logic associated with the analog process variable within the digital control system and to receive, from the user, a request to select a template from the one or more templates; and
    a template generator configured to automatically generate, based on the selection of the template, the one or more alias names for the corresponding one or more analog alarm sub-variables of the analog process alarm by substituting different portions of the name of an analog alarm sub-variable, wherein the one or more alias names are defined directly on the analog process variable.

12. The system of claim 11, wherein the processing logic associated with the analog process variable is to determine that an alarm condition has occurred and, based on the determination, selectively provide one or more notifications to an operator of the digital control system.

13. The system of claim 12, wherein the processing logic associated with the analog process is further configured to perform one or more of the following actions: enable a process, provide a set-point value, provide a time delay value, and set an alarm flag variable.

14. The system of claim 12, wherein the alarm condition includes an unexpected operational value.

15. The system of claim 12, wherein the one or more notifications include one or more of a sound, an indicator light, and an alarm list.

16. The system of claim 11, wherein the template generator is configured to:
    provide, to an operator, a configuration dialog box;
    receive, from the operator, input data, the input data including the one or more alias names for the sub-variables; and
    save the one or more alias names to a digital control system database.

17. The system of claim 11, wherein the sub-variables are associated with one or more of the following analog alarm properties: an input, an output, a parameter, and the operator being able to set the analog alarm properties using the configuration dialog box.

18. The system of claim 11, wherein the one or more alias names correspond to a specific naming convention.

19. The system of claim 11, wherein each of the one or more templates corresponds to a specific naming convention.

20. A non-transitory processor-readable medium having instructions for configuring an analog process alarm in a digital control system, which when executed by one or more processors, cause the one or more processors to:
    create, within the digital control system, one or more templates, wherein each template includes one or more alias names for corresponding one or more analog alarm sub-variables associated with an analog process variable;
    provide to a user, via a human-machine interface, an analog alarm virtual block diagram visualizing processing logic associated with the analog process variable within the digital control system;
    receive, from the user, a request to select a template from the one or more templates; and
    based on the selection of the template, automatically generate the one or more alias names for the corresponding one or more analog alarm sub-variables of the analog process alarm by substituting different portions of the name of an analog alarm sub-variable, wherein the one or more alias names are defined directly on the analog process variable.

* * * * *

UNITED STATES PATENT AND TRADEMARK OFFICE
CERTIFICATE OF CORRECTION

PATENT NO. : 8,836,497 B2
APPLICATION NO. : 13/555863
DATED : September 16, 2014
INVENTOR(S) : Grubbs et al.

Page 1 of 1

It is certified that error appears in the above-identified patent and that said Letters Patent is hereby corrected as shown below:

In the Specification

In Column 2, Line 60, delete "wrapping of the" and insert -- wrapping the --, therefor.

Signed and Sealed this
Thirtieth Day of June, 2015

Michelle K. Lee
*Director of the United States Patent and Trademark Office*